US010220282B1

(12) United States Patent
Steinkraus (10) Patent No.: US 10,220,282 B1
(45) Date of Patent: Mar. 5, 2019

(54) BALL THROWING DEVICE WITH INTERCHANGEABLE ACCESSORIES

(71) Applicant: Gramercy Products, Inc., Secaucus, NJ (US)

(72) Inventor: William Steinkraus, Fort Lee, NJ (US)

(73) Assignee: GRAMERCY PRODUCTS, INC., Secaucus, NJ (US)

( * ) Notice: Subject to any disclaimer, the term of this patent is extended or adjusted under 35 U.S.C. 154(b) by 0 days.

(21) Appl. No.: 15/968,772

(22) Filed: May 2, 2018

(51) Int. Cl.
| *F41B 3/00* | (2006.01) |
| *A63B 65/12* | (2006.01) |
| *A01K 15/02* | (2006.01) |
| *F41B 3/04* | (2006.01) |

(52) U.S. Cl.
CPC .......... *A63B 65/122* (2013.01); *A01K 15/027* (2013.01); *F41B 3/00* (2013.01); *F41B 3/04* (2013.01)

(58) Field of Classification Search
CPC .......... A63B 59/30; A63B 65/122; F41B 3/00
See application file for complete search history.

(56) References Cited

U.S. PATENT DOCUMENTS

| 491,558 A | 2/1893 | Hill |
| 1,175,035 A | 3/1916 | Wooster |
| 1,535,029 A | 4/1925 | Murch |
| 1,585,446 A | 5/1926 | Warwick |
| 3,206,202 A | 9/1965 | Evans |
| 3,428,036 A | 2/1969 | Parker |
| 3,589,349 A | 6/1971 | Parker |
| 3,841,292 A | 10/1974 | Hoffman |
| 4,974,574 A | 12/1990 | Cutlip |
| 5,390,652 A | 2/1995 | Minneman |
| 5,423,543 A | 6/1995 | Tarrant |
| 6,076,829 A | 6/2000 | Oblack |

(Continued)

FOREIGN PATENT DOCUMENTS

| CN | 103314870 | 9/2013 |
| GB | 2 385 537 | 8/2003 |

(Continued)

OTHER PUBLICATIONS

Press Fit Engineering and Design Calculator, Engineers Edge, available at: www.engineersedge.com/calculators/machine-design/press-fit/press-fit-calculator.htm.

*Primary Examiner* — John Ricci
(74) *Attorney, Agent, or Firm* — Thomas A. O'Rourke; Bodner & O'Rourke, LLP (57) ABSTRACT

A ball throwing device includes an arm, a ball holder at a first end thereof, a handle at a second end of the arm, and a mounting member configured for releasably mounting of interchangeable accessories. The mounting member has a first flange protruding away from the arm to a distal end, and a second flange protruding away from the first flange, in proximity to the distal end. The first flange has at least one recess. The interchangeable accessory has a mounting flange with an opening configured for the accessory to releasably couple to the mounting member. A first portion of the opening is shaped to be slidably received upon the first and second flanges; and a second portion of the opening is shaped to engage the at least one recess. The accessory may be: a spare ball holder, a pet waste bag dispenser, a pet treat container, etc.

11 Claims, 9 Drawing Sheets

(56) References Cited

U.S. PATENT DOCUMENTS

| | | |
|---|---|---|
| 6,477,745 B2 | 11/2002 | Strebl |
| 7,815,429 B1 | 10/2010 | Clark |
| D634,489 S | 3/2011 | Page |
| D637,248 S | 5/2011 | Levin |
| 8,028,684 B1 | 10/2011 | Weissmann |
| D664,722 S | 7/2012 | McCann |
| D674,851 S | 1/2013 | Osborne |
| 8,418,681 B2 | 4/2013 | Levin |
| 8,517,003 B2 | 8/2013 | Fisher |
| 8,720,385 B2 | 5/2014 | Tanner |
| 8,857,419 B2 | 10/2014 | Hansen |
| 8,973,564 B1 | 3/2015 | Saber |
| 9,149,695 B2 | 10/2015 | Evans |
| D758,511 S | 6/2016 | Williams |
| D759,907 S | 6/2016 | Weinstein |
| 9,392,768 B1 | 7/2016 | Mullin |
| D782,588 S | 3/2017 | Fryer |
| D782,752 S | 3/2017 | Knepper |
| 9,623,304 B2 | 4/2017 | Clarke |
| 9,656,136 B2 | 5/2017 | Van Alen |
| 9,757,632 B2 | 9/2017 | Fryer |
| 2004/0029656 A1 | 2/2004 | Vannoy |
| 2005/0263962 A1 | 12/2005 | Roh |
| 2011/0017184 A1 | 1/2011 | Henry |
| 2012/0042860 A1 | 2/2012 | McCann |
| 2012/0048251 A1 | 3/2012 | Oblack |
| 2012/0312286 A1 | 12/2012 | Kilian |
| 2013/0165278 A1 | 6/2013 | Butterfield |
| 2013/0186381 A1 | 7/2013 | Hansen |
| 2015/0342146 A1 | 12/2015 | Tucker |
| 2016/0096095 A1* | 4/2016 | Williams .......... A63B 69/0091 124/5 |
| 2016/0213990 A1 | 7/2016 | Mamangun |
| 2017/0001087 A1 | 1/2017 | Parness |
| 2017/0284764 A1 | 10/2017 | Mellen |

FOREIGN PATENT DOCUMENTS

| | | |
|---|---|---|
| WO | WO 2015/176324 | 11/2015 |
| WO | WO 2017/129993 | 1/2016 |

\* cited by examiner

BALL THROWING DEVICE WITH INTERCHANGEABLE ACCESSORIES

FIELD OF THE INVENTION

The present invention relates generally to a device for launching a ball over distances that are greater than may be achieved solely by use of the person's hand and arm, and more particularly relates to a ball throwing device configured to accommodate releasable attachment of various different interchangeable accessories, including, but not limited to, a spare ball holder, a dispenser for pet waste bags, and a pet treat container.

BACKGROUND OF THE INVENTION

The game of fetch is played with different animals, particularly with a dog. The game may be enjoyed by both the pet and the pet owner. The game of fetch may also simultaneously provide exercise for the animal. The game is played using an object, typically a stick or a ball, and sometimes a Frisbee, which may be held by the pet owner and thrown or spun a significant distance away, to provide a greater amount of exercise and reduce the number of tosses to achieve such exercise. The pet owner may also say the word "fetch to indicate the game is being played, and familiarize the pet with a command that will be used to indicate that the object is to be retrieved. The game is instinctively played by many dogs; however, other pets may need some help in learning the command to not only run after the thrown object, but to retrieve it as well.

Since many dogs can play the game for long periods of time, which may be tiresome for the pet owner, particularly when trying to fling the object far away so that dog needs to run farther, devices have been developed to aid such pet owners. Many such devices use a ball to play the game, as it allows it to be launched greater distances due to its ability to roll and bounce.

Devices that may be related, and which are not admitted herein to be prior art to the present invention, may be shown by the following.

U.S. Pat. No. 6,477,745 to Strebl for a clip for a ball-throwing toy for mounting of the device to an article of clothing.

U.S. Patent Application Pub. No. 2008/004140 by Matsumoto for a ball throwing and retrieving device.

U.S. Patent Application Pub. No. 2008/0072885 by Fitt for a throwing apparatus.

U.S. Patent Application Pub. No. 2009/0025699 by Mongkolkasetarin for a device for throwing an object.

U.S. Design Pat. No. D637,249 to Levin for a ball thrower.

U.S. Pat. No. 8,028,684 to Weissmann for a device and method for throwing objects.

U.S. Patent Application Pub. No. 2012/0048251 by Oblack for a launcher and projectile type pet toy.

U.S. Design Pat. No. D674,851 to Osborne for a ball launcher.

U.S. Pat. No. 8,418,681 to Levin for a ball thrower.

U.S. Patent Application Pub. No. 2013/0165278 by Butterfield for sports apparatus.

U.S. Patent Application Pub. No. 2012/0186381 by Hansen for a pet ball launcher with tuned scoop fingers.

U.S. Pat. No. 8,517,003 to Fisher for a ball throwing device and display package.

U.S. Pat. No. 8,720,385 to Tanner for a combined retractable leash and ball thrower.

U.S. Pat. No. 8,857,419 to Hansen for a pet ball launcher with tuned scoop fingers.

U.S. Patent Application Pub. No. 2015/0342146 by Tucker for an illuminated ball throwing apparatus and methods thereof.

U.S. Design Pat. No. D758,511 to Williams for a pet toy thrower.

U.S. Design Pat. No. D759,907 to Weinstein for a combination dog play and restrain unit.

U.S. Pat. No. 9,392,768 to Mullin for throw and fetch equipment.

The present invention offers advantages over prior art ball launching devices.

OBJECTS OF THE INVENTION

It is an object of the invention to provide a device that may launch a ball or other object over a distance that may be greater than may be achieved through the use of only the person's hand and arm.

It is another object of the invention to provide a launching device that may be configured to accommodate releasable attachment thereto of one of a plurality of interchangeable accessories.

It is a further object of the invention to provide a launching device that may be configured to accommodate releasable attachment thereto of a spare ball holder.

It is another object of the invention to provide a launching device that may be configured to accommodate releasable attachment thereto of a dispenser of pet waste bags.

It is also an object of the invention to provide a launching device that may be configured to accommodate releasable attachment thereto of a pet treat storage container.

Further objects and advantages of the invention will become apparent from the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A ball throwing device of the present invention may include: an elongated arm, a ball holder that may be formed at a first end of the arm; and a handle positioned proximate to a second end of the elongate arm. The elongated arm, the ball holder, and the handle may form a single unitary structure, and may be made of a plastic material. For better gripping, at least a portion of the handle may be over-molded with a rubber materiel. The ball throwing device may also include features that permit releasable attachment of various different interchangeable accessories. Therefore, the ball throwing device may also include a mounting member positioned on the elongated arm. The mounting member may be formed to include: a first flange and a second flange, which may, in one embodiment, be configured to form a T-shaped cross-section. The first flange may be configured to protrude (i.e., cantilever) away from the elongated arm, and may terminate at a distal end. The first flange may have a first portion and a second portion, in which the first portion may be formed to include at least one recess positioned between the distal end and the elongate arm, and the second portion may be otherwise have uniform and continuous (i.e., opposing smooth and substantially straight) surfaces between the distal end and the elongate arm. The second flange may be configured to protrude away from at least a portion of the first flange, in proximity to the distal end. In one embodiment, the second flange may be oriented to be substantially perpendicular to the first flange.

The interchangeable accessory may include a mounting flange having an opening that is configured for the interchangeable accessory to be releasably coupled to the T-shaped mounting member of the elongated arm. A first portion of the opening may be shaped to be slidably received upon the first and second flanges; and a second portion of the opening may be shaped to engage the at least one recess on the first flange of the mounting member on the elongated arm. In one embodiment, the first portion of the opening of the mounting flange of the interchangeable accessory may be shaped to be slidably received upon the mounting member in a clearance fit (i.e., a slip fit). In another embodiment, at least some portion of the first portion of the opening of the mounting flange may be shaped to be slidably received upon the mounting member in a slight friction fit.

Some interchangeable accessories that may be formed with these features for interchangeable mounting to the elongated arm of the ball throwing device may include, but are not limited to, a spare ball holder; a pet waste bag dispenser; and a pet treat container.

BRIEF DESCRIPTION OF THE DRAWINGS

The description of the various example embodiments is explained in conjunction with appended drawings, in which.

DETAILED DESCRIPTION OF THE INVENTION

As used throughout this specification, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" mean all of the following possible combinations: A alone; or B alone; or C alone; or A and B together; or A and C together; or B and C together; or A, B and C together.

Also, the disclosures of all patents, published patent applications, and non-patent literature cited within this document are incorporated herein in their entirety by reference.

Furthermore, the described features, advantages, and characteristics of any particular embodiment disclosed herein, may be combined in any suitable manner with any of the other embodiments disclosed herein.

Additionally, any approximating language, as used herein throughout the specification and claims, may be applied to modify any quantitative or qualitative representation that could permissibly vary without resulting in a change in the basic function to which it is related. Accordingly, a value modified by a term such as "about" is not to be limited to the precise value specified, and may include values that differ from the specified value in accordance with applicable case law. Also, in at least some instances, a numerical difference provided by the approximating language may correspond to the precision of an instrument for measuring the value. A numerical difference provided by the approximating language may also correspond to a manufacturing tolerance associated with production of the aspect/feature being quantified. Furthermore, a numerical difference provided by the approximating language may also correspond to an overall tolerance for the aspect/feature that may be derived from variation resulting from a stack up (i.e., the sum) of multiple individual tolerances.

Unless defined otherwise, all technical and scientific terms used herein have the same meaning as commonly understood by one of ordinary skill in the art to which this invention pertains. Although any methods and materials similar or equivalent to those described herein can also be used in the practice or testing of the present invention, representative illustrative methods and materials are now described.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely", "only" and the like in connection with the recitation of claim elements, or use of a "negative" limitation.

It is further noted that any use herein of relative terms such as "top," "bottom," "upper," "lower," "vertical," and "horizontal" are merely intended to be descriptive for the reader, based on the depiction of those features within the figures for one particular position of the device, and such terms are not intended to limit the orientation with which the device of the present invention may be utilized.

FIGS. 1-4 illustrate a first embodiment of the present invention, which may include a ball throwing device 100 and an accessory 200 that may be releasably mounted to the ball throwing device.

Figure 13:
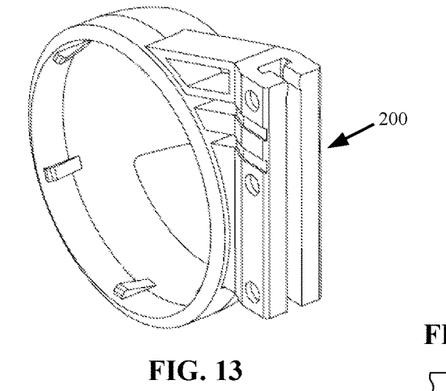
FIG. 13 is a perspective view of the interchangeable accessory shown in FIG. 1, and shown without the ball throwing device.

FIGS. 5-12 illustrate various views of the ball throwing device 100. The ball throwing device 100 may include an elongated arm portion 103. A first end of the elongated arm 103 may transition into, or have fixedly secured thereto, a ball holder 104. The ball holder 104 may have an interior surface 104I that may be formed to generally match a portion of the spherical shape of the ball. The ball holder 104 may also be formed with a plurality of fingers having tips 104T that may protrude inward slightly (i.e., into the theoretical sphere envelope) so that the ball holder may just be able to retain the ball therein even when inverted with the ball facing towards the ground. Other shapes for releasably supporting the ball that are known in the art may alternatively be used (see e.g., the protrusions of the ball holder accessory 200 shown in FIG. 13). A second end of the elongated arm 103 may transition into a handle portion 105. The elongated arm 103 and the handle portion 105 may be integrally formed as a unitary piece, or may alternatively be formed as separate parts that may be fixedly secured together. It should be noted that the all three portions—the elongated arm portion 103, the ball holder 104, and the handle portion 105—may be integrally formed as a unitary piece.

In one embodiment the elongated arm portion 103, the ball holder 104, and the handle portion 105 of the ball throwing device 100 may be made of plastic. In other embodiments, other suitable materials may alternatively be used. Also, the handle may be over-molded with rubber or another suitable material to provide for better gripping of the device by the user's hand.

Figure 19:
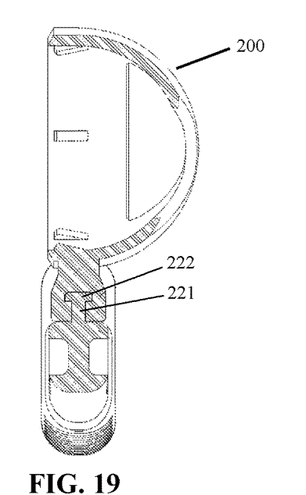
FIG. 19 is a cross-sectional view through the ball throwing device and its mounting member, and through the interchangeable accessory and its mounting flange, as seen in FIG. 4.

To accommodate attachment of various different interchangeable accessories, the ball throwing device 100 may be formed with a mounting member 120. The mounting member 120 may be positioned on the elongate arm 103, and in one embodiment may be positioned on the arm in proximity to the handle 105. As seen at least in FIGS. 10-12 and in FIG. 19, the mounting member 120 may include a first flange 121 and a second flange 122. The first flange 121 may be formed to protrude away from the elongate arm 103 to a distal end, and the second flange 122 may be formed to protrude away from at least a portion of the first flange, in proximity to the distal end. The second flange 122 may be used to create a "key" that may prevent the accessories (e.g., accessory 200) from sliding off of the first flange in a direction being generally perpendicular to the axial direction 100A (see FIG. 9) of the elongated arm 103. In one embodiment the second flange 122 may be formed to protrude away from the first flange 121 at an acute angle. In another embodiment the second flange 122 may be formed to protrude substantially perpendicularly away from the first flange 121 to form a T-shaped "key," as seen in FIG. 19.

Each of the interchangeable accessories, including accessory 200, which is shown in detail in FIGS. 13-17, may be formed to include a mounting flange 220 that may have an opening (i.e., a "keyway"—see FIGS. 15-16) that is configured to slidably receive the mounting member 120 therein, to releasably couple the accessory to the ball throwing device 100. The keyway of the mounting flange 220 may be formed to correspond to the particular key shape that is used. Where the T-shaped key is used for the mounting member 120 on the ball throwing device 100, the keyway of the mounting flange 220 of the accessory will having a corresponding "T" shape.

Figure 20:
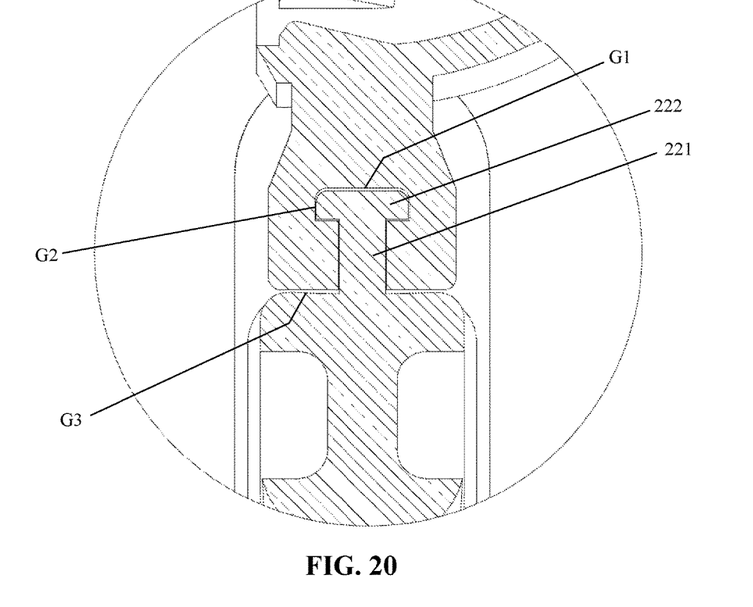
FIG. 20 is the cross-sectional view of FIG. 19 enlarged to show details of the engagement between the mounting member of the ball throwing device and the mounting flange of the interchangeable accessory.

In one embodiment the surfaces 221i and 221ii of the keyway of the mounting flange 220 may be formed to be substantially flat and parallel, and may be spaced apart to be received upon the thickness of the first flange 121 using a clearance fit. As shown by the gaps G1, G2, and G3 in the enlarged view of FIG. 20, the second flange 122 of the ball throwing device 100 may be received in the corresponding portion of the keyway of the mounting flange 220 in a clearance fit throughout its extent, and may thus permit a very small amount of sliding laterally (e.g., perpendicular to the axial direction 100A of the arm 105).

In another embodiment, the surfaces 221i and 221ii of the keyway of the mounting flange 220 may be formed to be substantially flat and parallel, but may be spaced apart to be received upon the thickness of the first flange 121 using a friction fit. The friction fit (i.e., an interface fit) therebetween may be a slight interference in one embodiment and may be in the range of 0.0001 inches to 0.0003 inches, or an interference of 0.0003 inches to 0.0007 inches in another embodiment, or an interference of 0.0007 inches to 0.0010 inches in yet another embodiment, or a combination of such ranges. Other sizes to provide the interference fit may also be used in different embodiments (see e.g., "Press Fit Engineering and Design Calculator," available at: www.engineersedge.com/calculators/machine-design/press-fit/press-fit-calculator.htm).

Figures 14, 16, 17:
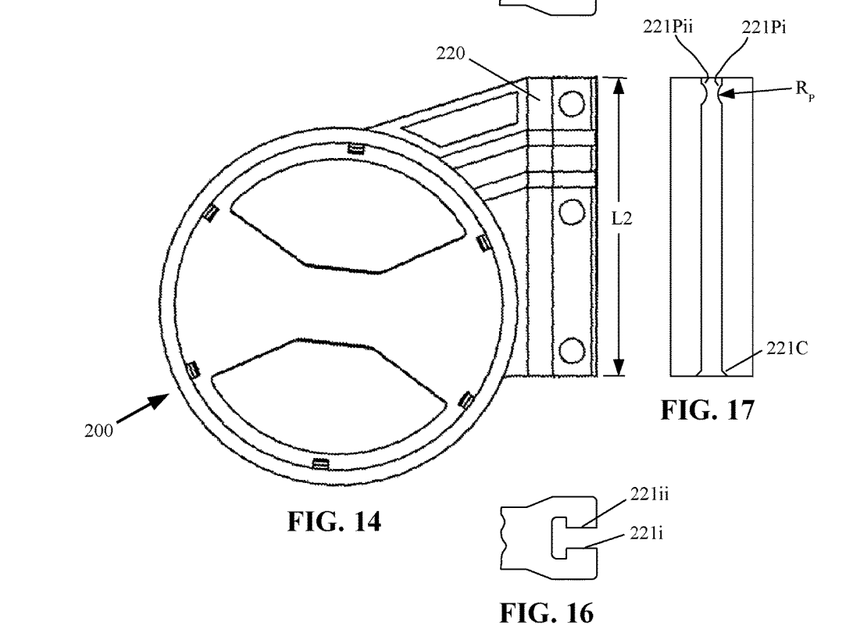
FIG. 14 is a front view of the interchangeable accessory of FIG. 13.
FIG. 16 is a second end view of the mounting portion of the interchangeable accessory of FIG. 14.
FIG. 17 is a side view of the mounting portion of the interchangeable accessory of FIG. 14.
Figure 15:
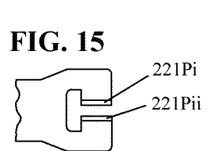
FIG. 15 is a first end view of the mounting portion of the interchangeable accessory of FIG. 14.
Figure 18:
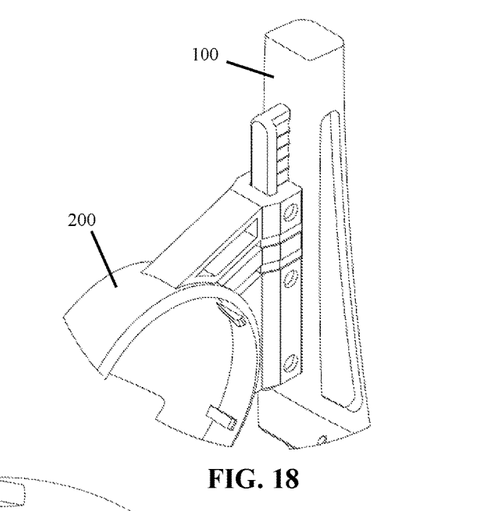
FIG. 18 is an enlarged detail view of the interchangeable accessory of FIG. 13 shown mounted to the mounting flange of the ball throwing device of FIG. 5, at one possible mounting location.

This interference fit may help to generally deter dislodgment (sliding) of the accessory off of the mounting member 120 in the opposite direction that it was mounted, when the ball throwing device 100 is used for throwing the ball. Note that a flange/stop 122E shown in FIG. 9 may prevent sliding of the accessory off of the mounting member 120 in the same direction that it was mounted. To assist in initially coupling the mounting flange 220 of the accessory to the mounting member 120 of the ball throwing device 100, a chamfer 221C may be formed on the ends of each of the surfaces 221i and 221ii, as shown in FIG. 17.

To better prevent such accidental sliding and inadvertent decoupling of the accessory from the ball throwing device 100, the first flange 121 may additionally/alternatively be formed with at least one recess (e.g., recess R1i), and at least one of the surfaces 221*i* and 221*ii* may be formed with a protrusion that may be sized to engage and contact a portion of the recess. In another embodiment, the first flange 121 may be formed with at least one recess on each side of the flange (e.g., recess R1*i* and recess R1*ii*), and each of the surfaces 221*i* and 221*ii* may be formed with a corresponding protrusion (e.g.. 221Pi and 221Pii—see FIG. 17), which protrusions may be sized to engage with, and may contact a respective portion of the recesses. In another embodiment, a plurality of pairs of recess may be used (e.g., R1*i* and R1*ii*; R2*i* and R2*ii*; R3*i* and R3*ii*; R4*i* and R4*ii*; R5*i* and R5*ii*; etc.), where each of the pairs of recesses may be respectively (and successively) engaged by the protrusions 221Pi and 221Pii.

Figure 10:
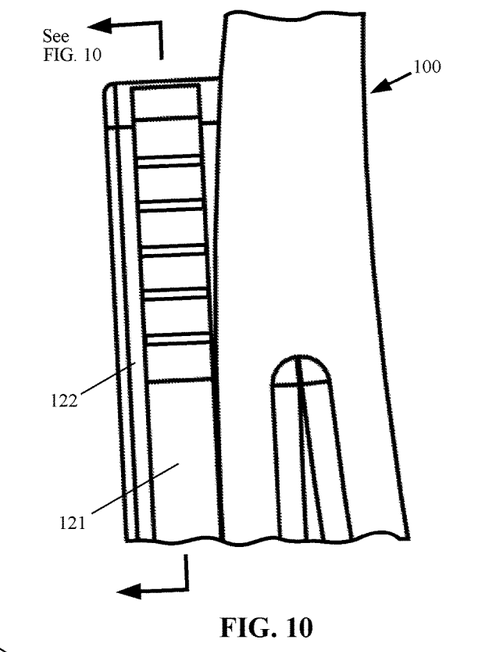
FIG. 10 is an enlarged detail view of the mounting member of the ball throwing device of FIG. 5.
Figure 11:
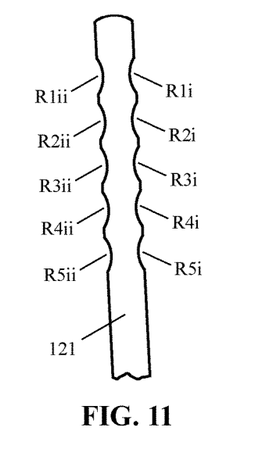
FIG. 11 is a cross-sectional view through the mounting flange of the mounting member of FIG. 10.
Figure 12:
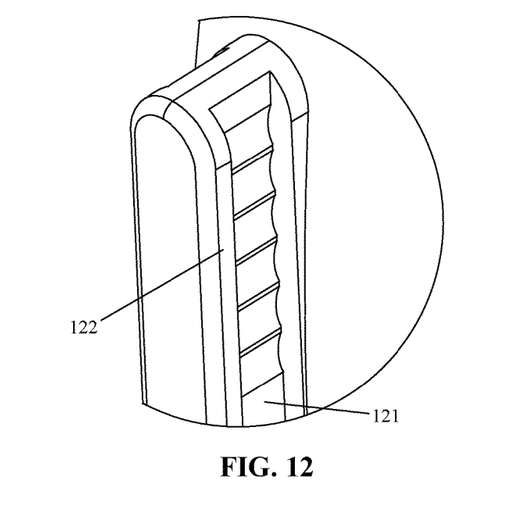
FIG. 12 is an enlarged perspective view of the mounting member of FIG. 5.

The protrusions may each be formed to any suitable shape, and in one embodiment they may be cylindrical having a radius $R_P$. Alternatively, they may have an elliptical shape, or another curved shape, or may even have a rectangular shape. The recesses may also be formed to any suitable shape that may correspond to the shape used for the protrusion(s), and in one embodiment, the recesses may be formed to be cylindrical, and may furthermore be formed to have the same radius as the radius $R_P$ of the protrusions. In another embodiment, to better facilitate removal, the recesses that may be formed to be cylindrical may be formed with a larger radius than that which is used for the protrusions. Also, in one embodiment, as seen in FIGS. 10-11, the recesses may be spaced a small distance apart from each other, which may require more deliberate/continuous action on the part of the user to effect separating of the two parts, and which may better serve to prevent dislodgment during vigorous use of the device by a user. In another embodiment, the recesses may not be spaced apart, and the flat therebetween may furthermore be replaced with a concave surface (e.g., the succession of recesses may form a sinusoidal shape).

Figure 1:
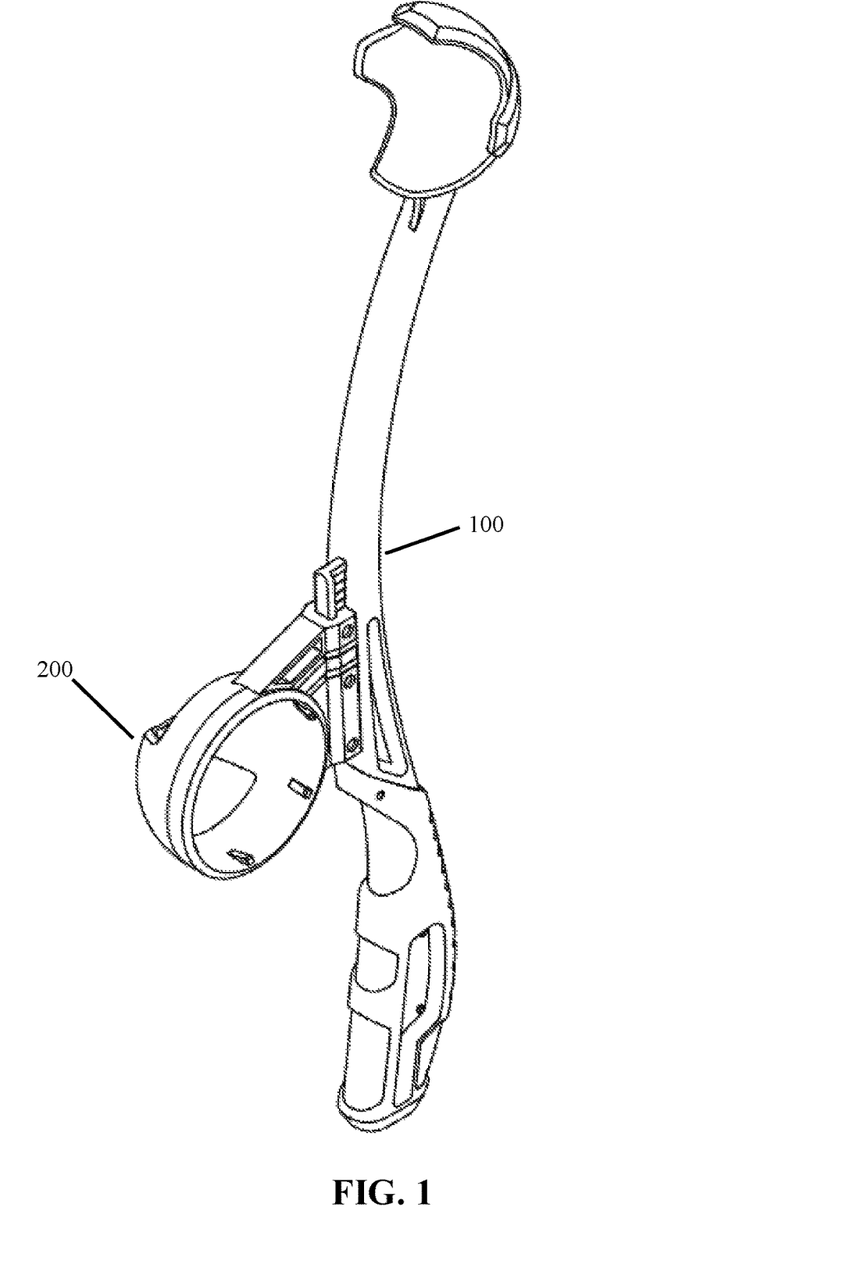
FIG. 1 is a perspective view of a combination ball throwing device with an interchangeable accessory releasably mounted thereto, which accessory is configured to hold a spare ball.
Figure 2:
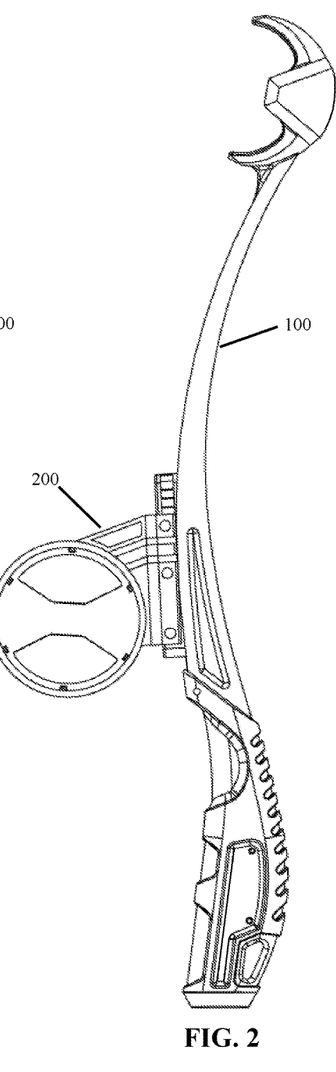
FIG. 2 is a side view of the combination ball throwing device and interchangeable accessory shown in FIG. 1.
Figure 3:
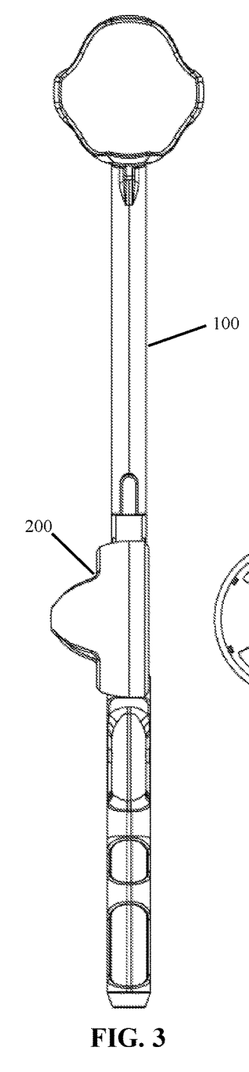
FIG. 3 is a front view of the combination ball throwing device and interchangeable accessory shown in FIG. 1.
Figure 4:
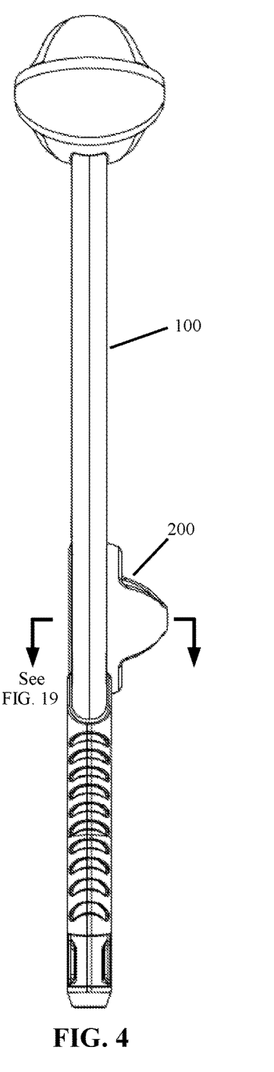
FIG. 4 is a rear view of the combination ball throwing device and interchangeable accessory shown in FIG. 1.
Figure 5:
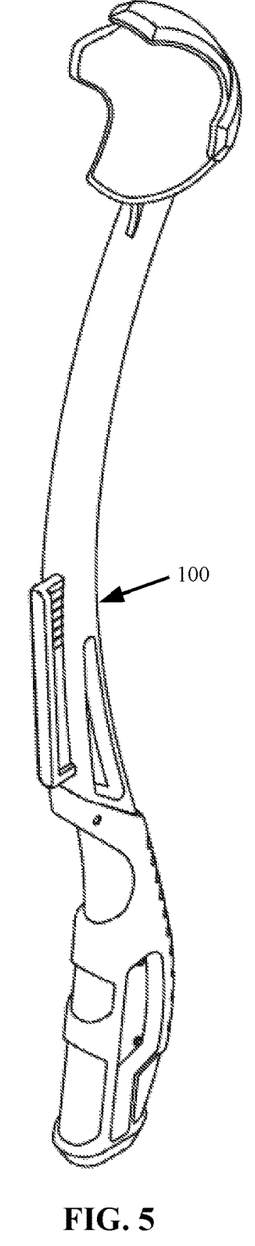
FIG. 5 is a perspective view showing the ball throwing device as seen in FIG. 1, but is shown without the interchangeable accessory attached thereto.
Figures 6, 7, 9:
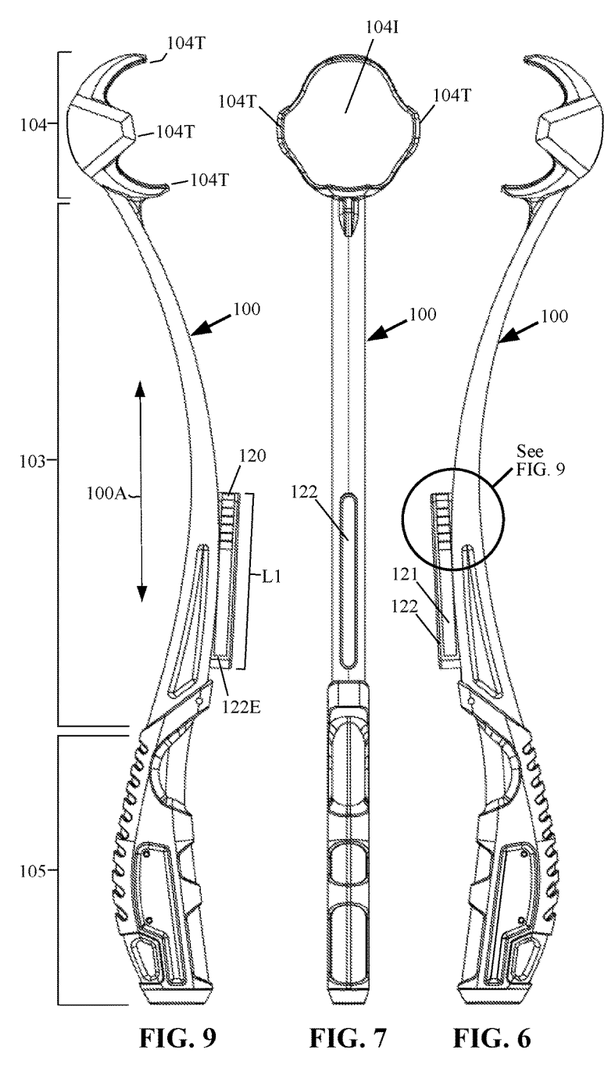
FIG. 6 is a first side view of the ball throwing device of FIG. 5.
FIG. 7 is a front view of the ball throwing device of FIG. 5.
FIG. 9 a second side view of the ball throwing device of FIG. 5.
Figure 8:
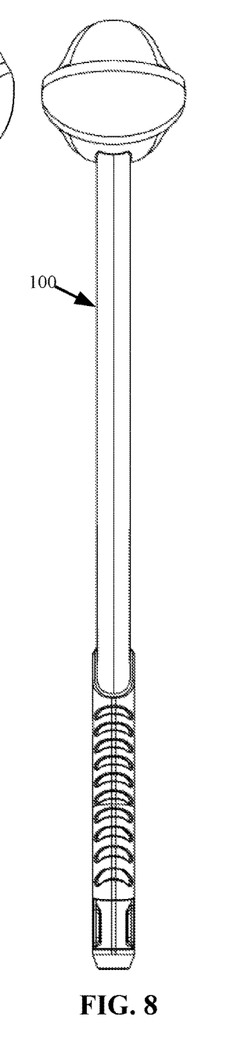
FIG. 8 is a rear view of the ball throwing device of FIG. 5.

The length L1 of the mounting member 120 of the ball throwing device 100 (FIG. 9) may be formed to accommodate the mounting flange 220 of the accessory 200 in any one of several different ways. In one embodiment (e.g., where there may only be one pair of recesses, R1*i* and R1*ii*), the length L1 of the mounting member 120 may be just sufficiently long enough to receive the entire length L2 of the mounting flange 220 of the accessory 200 (FIG. 14) so that the protrusions 221Pi/221Pii engage the recesses R1*i*/R1*ii*, which may be at either end of the mounting flange. In another embodiment, where a plurality of pairs of recesses are used, the length L1 of the mounting member 120 may be longer than the length L2 of the mounting flange 220 of the accessory 200, so that the protrusions 221Pi/221Pii may nonetheless be able to engage the last of the pair of recesses on the flange, as shown in FIG. 2, and the entire length L2 of the mounting flange 220 may be mated with the entire length L1 of the mounting member 120, no matter which set of recesses are engaged by the pair of protrusions 221Pi/221Pii.

Figure 21:
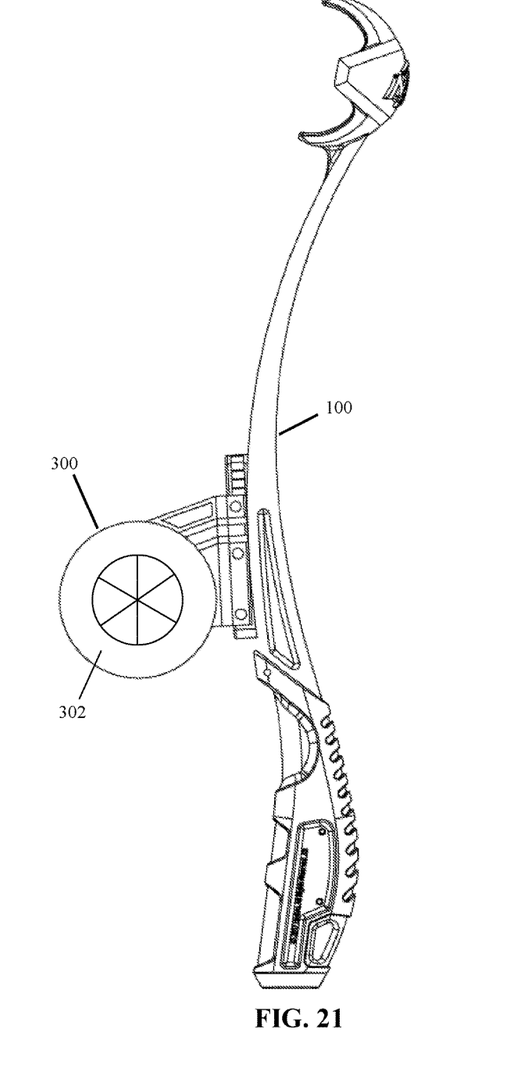
FIG. 21 is a side view of the combination ball throwing device of FIG. 6 and another interchangeable accessory that is configured to dispense pet waste storage bags.
Figure 22:
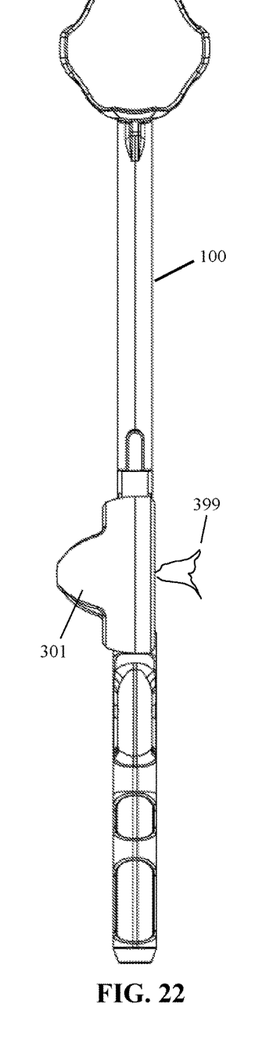
FIG. 22 is a front view of the combination ball throwing device and interchangeable accessory of FIG. 21.

As seen in FIGS. 21 and 22, an accessory 300 having the same mounting features as accessory 200 may instead be configured as a container that may hold and may individually dispense pet waste bags 399. The accessory 300 may have a container portion 301 and a removable cover 302, which may have a plurality of radial slits, through which the pet waste bags 399 may be pulled out, one at a time.

Figure 23:
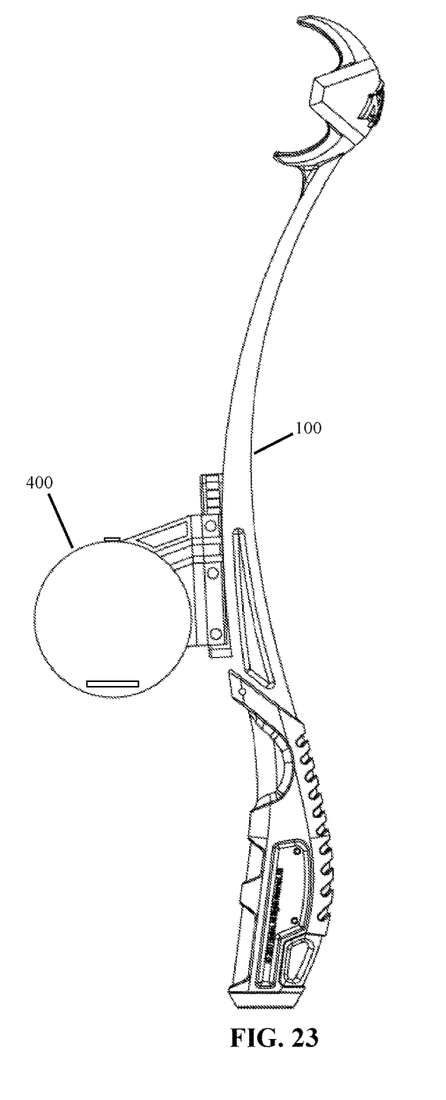
FIG. 23 is a side view of the combination ball throwing device of FIG. 6 and another interchangeable accessory that is configured to store pet treats.
Figure 24:
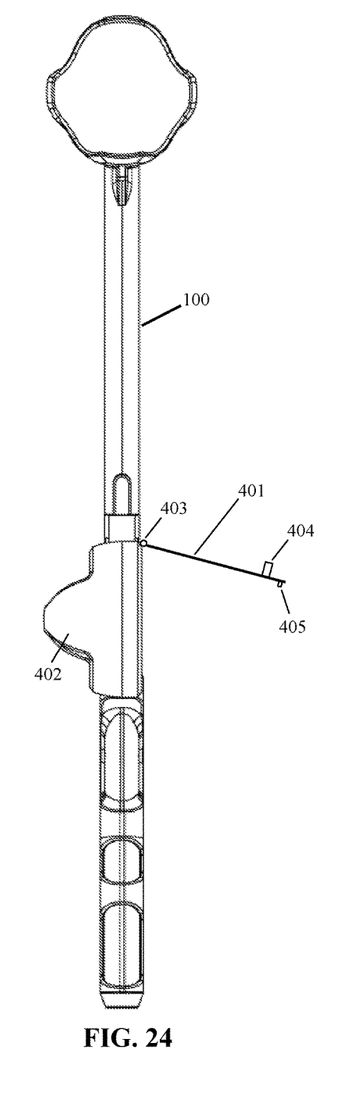
FIG. 24 is a front view of the combination ball throwing device and interchangeable accessory of FIG. 23.

As seen in FIGS. 23 and 24, an accessory 400 having the same mounting features as accessory 200 may instead be configured as a container that may hold pet treats. The accessory 400 may have a door 401 that may be pivotally mounted to the container portion 402 using a hinge 403. A handle 404 may be used to open/close the door 401, which may be maintained in a closed position using a latch. The latch may include a member 405 (e.g., a hook member) that may be retained in the closed position using a detent arrangement housed within the container portion 402, similar to that disclosed by U.S. Pat. No. 6,447,030 to Meinke. Other latch arrangements may also be used.

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

What is claimed is:

1. A combination ball throwing device and interchangeable accessory,
   said ball throwing device comprising:
      an elongate arm;
      means for releasably holding a ball at a first end of said elongated arm;
      a handle positioned proximate to a second end of said elongated arm; and
      a mounting member positioned on said elongated arm and comprising:
         a first flange configured to protrude away from said elongated arm to a distal end, and having a first portion and a second portion, said first portion of said first flange comprising at least one recess positioned between said distal end and said elongated arm;
         a second flange configured to protrude away from at least a portion of said first flange, in proximity to said distal end;
   said interchangeable accessory comprising:
      a mounting flange comprising an opening configured for said interchangeable accessory to releasably couple to said mounting member; a first portion of said opening shaped to be slidably received upon said first and second flanges; and a second portion of said opening shaped to engage said at least one recess.

2. The combination ball throwing device and interchangeable accessory according to claim 1,
   wherein said first flange comprises a length configured to extend substantially parallel to an axial direction of said elongated arm; and
   wherein said at least one recess comprises a plurality of said recesses positioned successively along said length of said first flange.

3. The combination ball throwing device and interchangeable accessory according to claim 1, wherein said second flange is configured to protrude away from said first flange to form a T-shaped cross-section.

4. The combination ball throwing device and interchangeable accessory according to claim 1, wherein said first portion of said opening is shaped to be slidably received upon said mounting member in a clearance fit.

5. The combination ball throwing device and interchangeable accessory according to claim 1, wherein said first portion of said opening is shaped to be slidably received upon said mounting member in a slight friction fit.

6. The combination ball throwing device and interchangeable accessory according to claim 1, wherein said mounting member is positioned on said elongated arm between said handle and said means for releasably holding a ball.

7. The combination ball throwing device and interchangeable accessory according to claim 1,
wherein said elongated arm, said means for releasably holding a ball, and said handle are made of a plastic material; and
wherein said combination ball throwing device and interchangeable accessory further comprises a rubber material over-molded over at least a portion of said handle.

8. The combination ball throwing device and interchangeable accessory according to claim 1, wherein said interchangeable accessory comprises means for releasably holding a spare ball.

9. The combination ball throwing device and interchangeable accessory according to claim 1, wherein said interchangeable accessory comprises a pet waste bag dispenser.

10. The combination ball throwing device and interchangeable accessory according to claim 1, wherein said interchangeable accessory comprises a pet treat container.

11. A combination ball throwing device and accessory,
said ball throwing device comprising:
an elongate arm;
means for releasably holding a ball at a first end of said elongated arm;
a handle positioned proximate to a second end of said elongated arm; and
a mounting member positioned on said elongated arm and comprising:
a first flange configured to protrude away from said elongated arm to a distal end;
a second flange configured to protrude away from at least a portion of said first flange, in proximity to said distal end;
said accessory comprising:
attachment means for releasably coupling said accessory to said mounting member of said ball throwing device.

* * * * *